United States Patent [19]

Ogawa

[11] Patent Number: 5,337,109

[45] Date of Patent: Aug. 9, 1994

[54] ZOOM VIEW FINDER

[75] Inventor: Yuzi Ogawa, Tokyo, Japan

[73] Assignee: Asahi Kogaku Kogyo Kabushiki Kaisha, Tokyo, Japan

[21] Appl. No.: 29,965

[22] Filed: Mar. 9, 1993

Related U.S. Application Data

[63] Continuation of Ser. No. 708,205, May 31, 1991, abandoned.

[30] Foreign Application Priority Data

Jun. 4, 1990 [JP] Japan .............................. 2-58957[U]
Jun. 13, 1990 [JP] Japan .............................. 2-62313[U]
Jun. 13, 1990 [JP] Japan .............................. 2-62314[U]

[51] Int. Cl.$^5$ .............................................. G03B 13/10
[52] U.S. Cl. .................................................. 354/222
[58] Field of Search ................................ 354/199, 222

[56] References Cited

U.S. PATENT DOCUMENTS

| | | | |
|---|---|---|---|
| 4,165,933 | 8/1979 | Sunouchi et al. | 354/106 |
| 4,887,109 | 12/1989 | Fujita et al. | 354/222 |
| 4,944,030 | 7/1990 | Haraguchi et al. | 354/222 |
| 4,945,372 | 7/1990 | Higuchi et al. | 354/222 |
| 4,967,219 | 10/1990 | Morisawa et al. | 354/199 |
| 5,111,227 | 5/1992 | Ogawa | 354/222 |

FOREIGN PATENT DOCUMENTS

| | | |
|---|---|---|
| 2259145 | 6/1973 | Fed. Rep. of Germany . |
| 3932261 | 4/1990 | Fed. Rep. of Germany . |
| 3933190 | 4/1990 | Fed. Rep. of Germany . |
| 3933191 | 4/1990 | Fed. Rep. of Germany . |
| 2638540 | 5/1990 | France . |
| 63-174025 | 7/1988 | Japan . |
| 1261623 | 10/1989 | Japan . |
| 0897234 | 5/1962 | United Kingdom . |
| 897234 | 5/1962 | United Kingdom . |
| 2223602 | 4/1990 | United Kingdom . |
| 2224359 | 5/1990 | United Kingdom . |
| 8707038 | 11/1987 | World Int. Prop. O. . |

OTHER PUBLICATIONS

English Language Abstract of Japanese Patent Document No. 63-174,025.

English Language Abstract of Japanese Patent Document No. 1-261,623.

British Search Report, application No. 9111979.2, Sep. 12, 1991.

French Search Report and Annex, application No. 9106716, Aug. 23, 1991.

*Primary Examiner*—David M. Gray
*Attorney, Agent, or Firm*—Sandler, Greenblum & Bernstein

[57] ABSTRACT

A zoom view finder includes a stationary lens group, a variable power lens group movable relative to the stationary lens group and a drive mechanism which can be connected to a drive source to drive the variable power lens group. A unified finder case which supports the stationary lens group, the movable variable power lens group and the drive mechanism is provided.

20 Claims, 3 Drawing Sheets

ZOOM VIEW FINDER

This application is a continuation of application Ser. No. 07/708,205, filed May 31, 1991, now abandoned.

BACKGROUND OF THE INVENTION

1. Field of the Invention

The present invention relates to a zoom view finder. More precisely, it relates to a zoom view finder having a group of stationary lenses and a group of movable variable power lenses.

2. Description of Related Art

A zoom view finder is widely used with a lens shutter type camera having a variable focal length lens. In a known zoom view finder, since a movable variable power lens group is moved in accordance with the focal length, which is adjusted by a photographing optical system, the zoom view finder is usually incorporated in a camera body with the photographing optical system and other driving devices.

Accordingly, if only a zoom view finder is to be disassembled or detached from the camera body for inspection, for example, then the camera body itself and a lens block of the photographing optical system, etc. must also be disassembled, thus resulting in laborious and troublesome operations.

SUMMARY OF THE INVENTION

The primary object of the present invention is to provide a zoom view finder which can easily and independently be attached to, and detached from, a camera body.

To achieve the object mentioned above, according to the present invention, there is provided a zoom view finder including a group of stationary lenses, a group of variable power lenses movable relative to the stationary lens group, a drive mechanism which drives the variable power lens group, and a unified finder case which supports the stationary lens group, the movable variable power lens group and the drive mechanism.

In this arrangement, the unified zoom finder can be easily and independently attached to and detached from the camera body such as, for example, for inspection and repairs.

Preferably, the finder case includes a plurality of split frames comprised of an upper frame, an intermediate frame and a lower frame. It is possible to provide an input device for the drive mechanism, connected to a drive source, outside the finder case.

Preferably, at least two stationary lens groups, of the front and rear stationary lens groups are provided at the frontmost and rearmost positions of the finder case, in the optical axis direction. In this arrangement, the front and rear stationary lens groups and the split frame can generically constitute a closed finder unit. The movable lens group and the drive mechanism, etc. can be accommodated in the closed finder unit to substantially isolate the accommodated components from dust or the like.

In a preferred embodiment, a biasing mechanism is provided to continuously bias the movable variable power lens group so as to move it in one of the optical axis directions. A worm wheel mechanism can be provided, between the variable lens group and the drive mechanism, to hold the variable lens group at an adjusted position against the biasing mechanism. In this embodiment, the zoom view finder can be attached to the camera body while maintaining the variable power lens group at an optimum position (adjusted position) in the finder case. Only one face of the worm wheel mechanism teeth is forceably in mesh with the help of the biasing mechanism, accordingly the variable power lens group can be smoothly moved without oscillation and noise, etc.

The present disclosure relates to subject matter contained in Japanese utility model applications No. 2-58957 (filed on Jun. 4, 1990), No. 2-62313 (filed on Jun. 13, 1990) and No. 2-62314 (filed on Jun. 13, 1990) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 3:
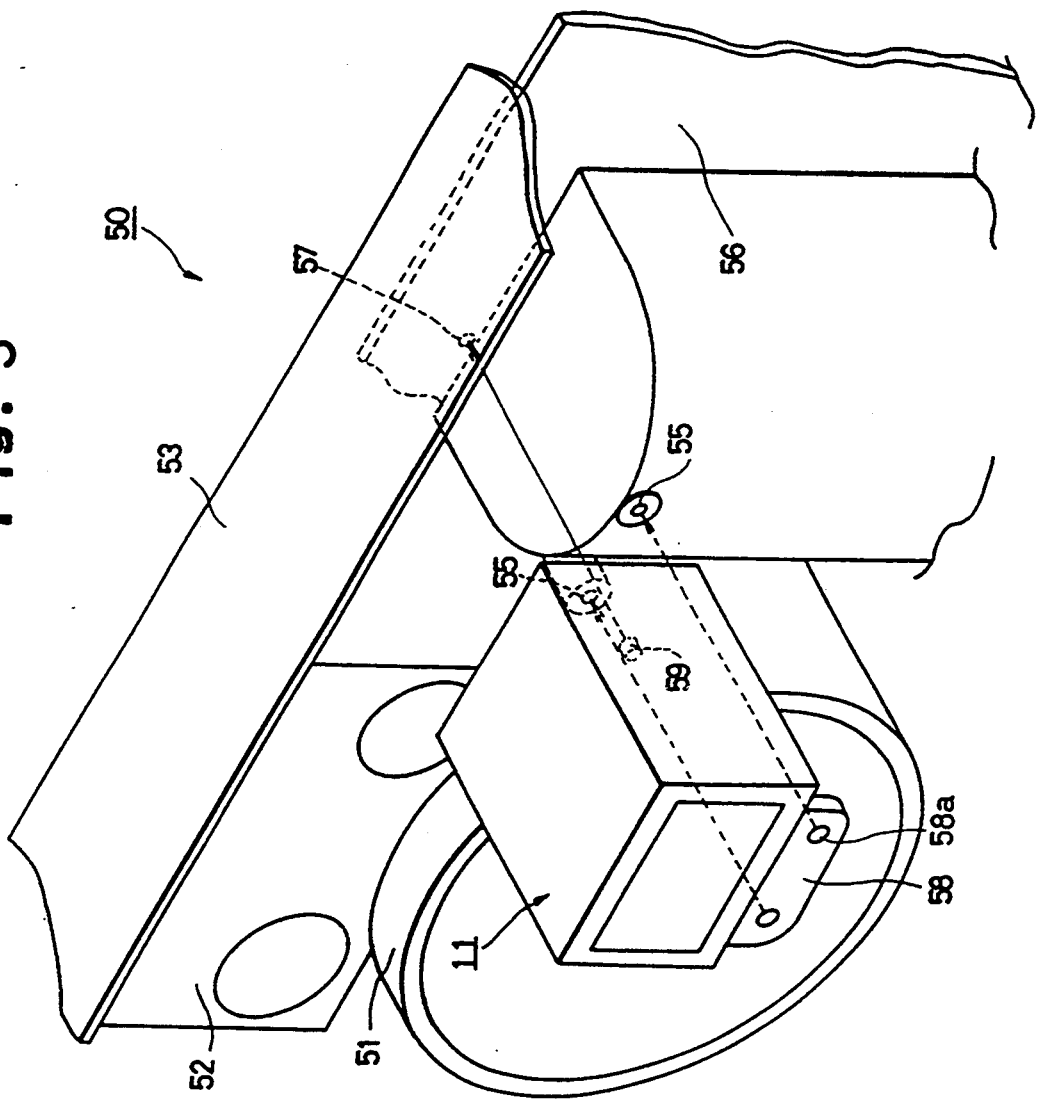

As can be seen in FIG. 3, a camera body 50 has a lens barrel 51 and an object distance measuring device 52 above the lens barrel 51. A printed circuit board 53 is provided above the object distance measuring device 52.

The camera body 50 has at least one threaded hole 55. At least one positioning hole 57 is formed in a substrate 56 which forms a part of the camera body 50. The zoom view finder 11 of the present invention which can be attached to the camera body 50 has at least one positioning pin 59 which is formed on the rear wall of the zoom view finder 11 in the optical axis direction to be fitted in the corresponding positioning hole 57 of the substrate 56 and a securing bracket 58 which is provided on the front end of the zoom view finder 11 in the optical axis direction. The securing bracket 58 is provided with at least one threaded hole 58a through which a set screw (not shown) screwed into the threaded hole 55 of the camera body 50 to detachably attach the zoom view finder 11 to the camera body 50.

Figure 1:
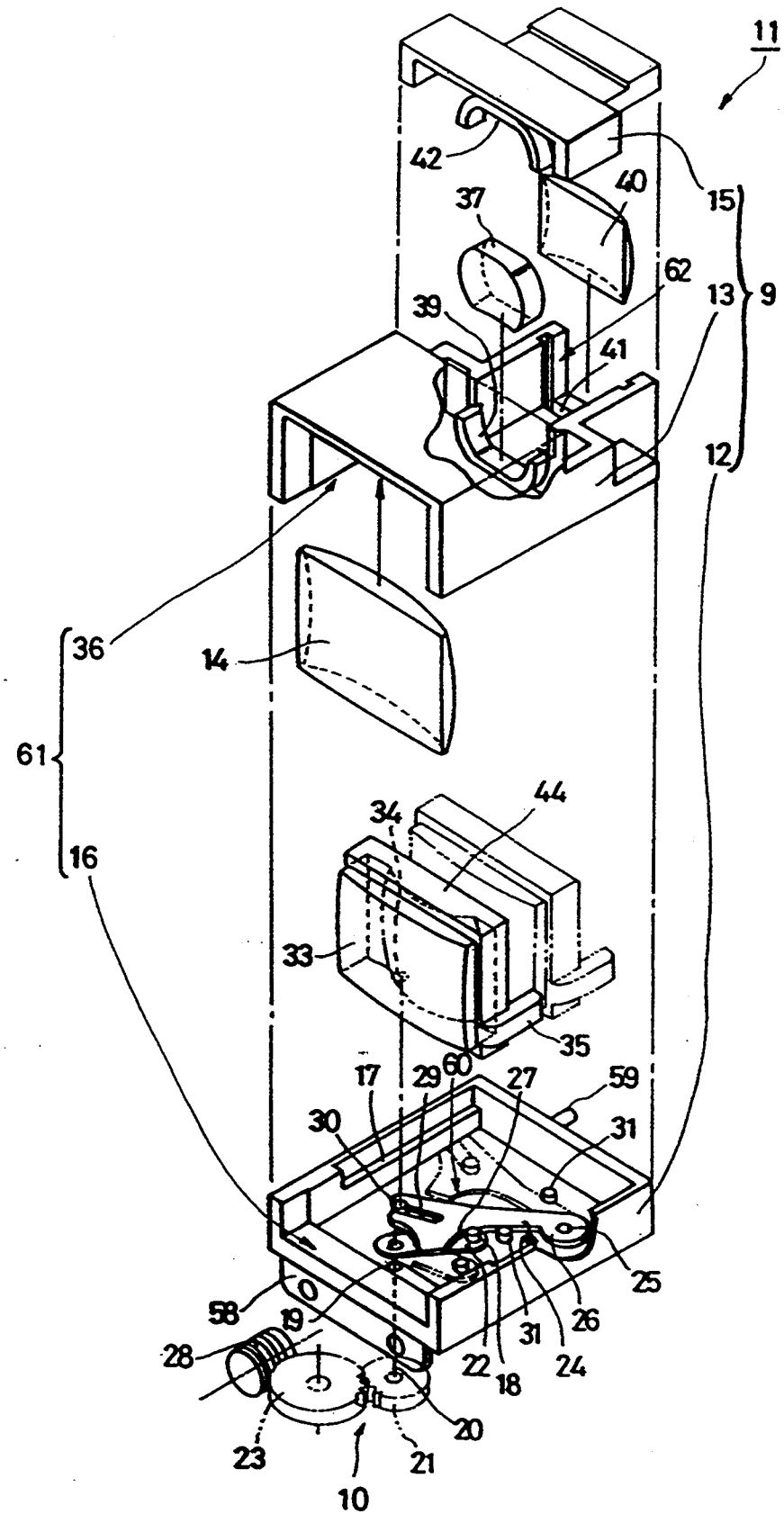
FIG. 1 is an exploded perspective view of a zoom view finder according to an embodiment of the present invention.

Referring to FIG. 1, the zoom view finder 11 has a unified finder case 9 which is comprised of a lower frame 12, an intermediate frame 13 and an upper frame 15. The lower, intermediate and upper frames 12, 13 and 15 constitute a closed finder unit when assembled, in which groups of stationary lenses 14, 37 and 40 are aligned along the optical axis thereof, so that these lens groups, the group of movable variable power lens 33 and driver 60 thereof, which will be discussed below, can be isolated or protected from dust or the like. Note that the term "closed", referred to as utilized herein, does not mean a completely sealed state, but means a substantially closed state so as to prevent dust or other foreign matter from entering the finder unit.

The lower frame 12 is provided on its front end (left end in FIG. 1) with the securing bracket 58 mentioned above and a lens frame 16 in which the securing lens group 14 is fitted. The lower frame 12 is also provided on its right and left side inner walls with lens guide grooves 17. A small hole 19 is formed on the bottom of the lower frame 12, so that a drive shaft 20 can be fitted in the hole 19.

The drive shaft 20, which is located within the lower frame 12, is secured one end of a drive cam lever 22 by a key or the like so as to prevent relative rotation. The other end of the drive cam lever 22 is provided with a cam pin 18 projecting upwardly therefrom. A lens driving lever 26 is rotatably supported on the lower frame 12 through a pivot shaft 25 so as to partially overlap the drive cam lever 22.

Figure 2:
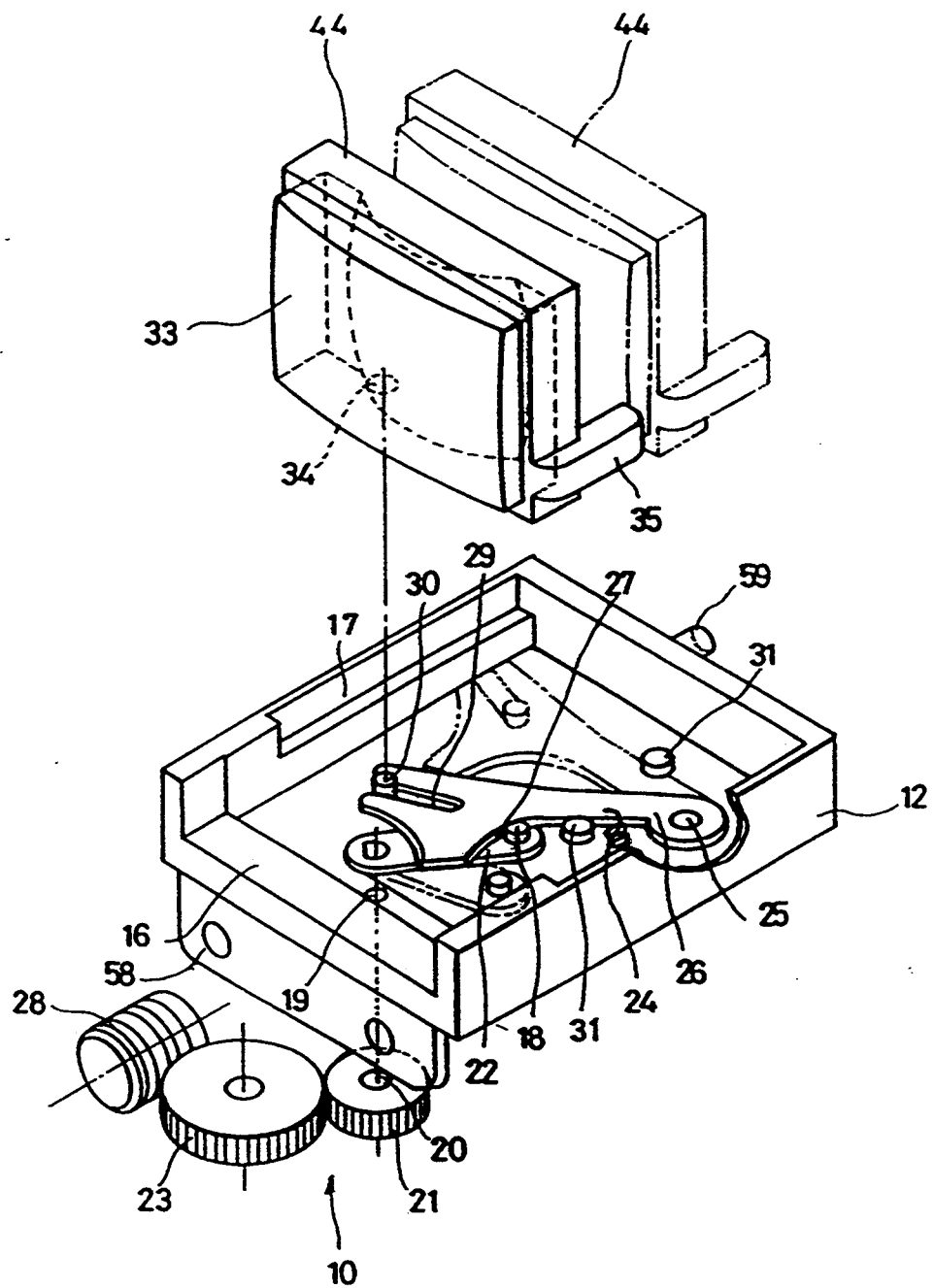
FIG. 2 is an enlarged perspective view of a lower frame of a zoom view finder shown in FIG. 1; and, FIG. 3 is a perspective view of a supporting mechanism in a camera body to which a zoom view finder of the present invention is attached.

The lens driving lever 26 is continuously biased by a tensile spring (biasing mechanism) 24 in the counterclockwise direction (as seen in FIGS. 1 and 2). The lens driving lever 26 is provided on its front end with a guide groove 29 formed therein which extends radially of the pivot shaft 25, and a guide pin 30 is slidably fitted in the guide groove 29. The lens driving lever 26 is provided on its one side face with an arched cam surface 27 which comes into contact with the cam pin 18. A pair of angular displacement restricting pins 31 are provided on opposite sides of the lens driving lever 26 along the track of the rotational movement of the lens driving lever 26 to restrict extreme angular displacement of the latter.

On the lower surface of the lower frame 12 a gear train 10 is provided, having lens driving gears 21 and 23 and a lens driving worm gear 28. The lens driving gear 21 is integrally connected to the portion of the drive shaft 20 that projects outwardly from the lower frame 12 by a key or spline so as not to relatively rotate.

The lens driving worm gear 28, which is connected to the gear 21 through the lens driving gear 23, is located at the upstream end of the gear train 10 to be connected to a zoom motor (not shown) as a drive source. The lens driving gear 23 and the lens driving worm gear 28 constitute a worm wheel mechanism. The drive cam lever 22, the lens driving lever 26, and the tensile spring 24 constitute an internal drive mechanism 60. The internal drive mechanism 60 and the gear train 10 including the worm wheel mechanism constitute a main (whole) drive mechanism.

The movable variable lens group 33 is held in a movable lens holder 44 which is provided with right and left guide ribs 35. The guide ribs 35 are located in the lens guide grooves 17 formed in the lower frame 12 when the guide pin 30 is fitted in an engaging hole 34 formed on the lower surface of the movable lens holder 44.

The intermediate frame 13 is shaped so that it covers the upper portion of the lower frame 12 and has a lens frame 36 which, together with lens frame 16, defines a front opening 61 in which the first stationary lens group is fitted. The intermediate lens frame 13 is provided on its rear portion with a lens frame 39 in which the second stationary lens group 37 is fitted, and also with a lens frame 41 which defines a rear opening 62 in which the third stationary lens group 40 is fitted. The lens guide grooves 17 of the lower frame 12 are shaped so as to guide and support the right and left side ribs 35 which slide therein.

The upper frame 15 is shaped so that it covers the rear portion of the intermediate frame 13. The upper lens frame 15 contains another lens frame 42 internal thereto. Lens frame 42 together with lens frame 39 secure the lens group 37. An upper lens frame (not shown) together with lens frame 41 secure the lens group 40.

After the internal drive mechanism 60 of the movable variable power lens group 33 is incorporated in the lower frame 12, and the movable variable power lens group 33 is located in the guide grooves 17, the internal drive mechanism 60 and the movable variable power lens group 33 are enclosed by the intermediate frame 13, the upper frame 15 and by the first and third stationary lens groups 14(front) and 40(rear) to isolate them from dust. In this arrangement, the zoom view finder 11 can be easily attached to and detached from the camera body 50 as a finder unit, independent of the photographing optical system.

The operation of the zoom view finder 11, when attached to the camera body 50 with the lens driving gear 23 of the driving gear train 10 connected zoom motor as a drive source, is as follows.

When the zoom motor of the camera body 50 is driven, the rotation thereof is transmitted to the drive cam lever 22 in the finder case 9 through the lens driving worm gear 28, the lens driving gears 23 and 21, and the drive shaft 20.

Counterclockwise rotation of the drive cam lever 22, forces cam pin 18 against the cam surface 27 countering the bias of the tensile spring 24, which in turn rotates the lens driving lever 26 in the clockwise direction. As a result, the lens driving lever 26 causes the guide pin 30 to slide into the guide groove 29 thereby moving the movable variable power lens group 33 rearwardly along the lens guide grooves 17 (right hand direction in FIG. 1). Consequently, the distance between the first stationary lens group 14 and the movable variable lens group 33 varies, so that the angle of view within the field of view through the third stationary lens group 40 varies in accordance with the change of the focal length.

When the driving cam lever 22 is rotated in the clockwise direction, the cam pin 18 moves away from the cam surface 27. As a result, the lens driving lever 26 is rotated in the counterclockwise direction with the cam pin 18 and the cam surface 27 in contact, with the help of the biasing force of the tensile spring 24. Consequently, the movable variable power lens group 33 is moved in the optical axis direction along the lens guides 17 to vary the angle of view of the view finder in accordance with the focal length.

When the movable variable lens group 33 is moved in the optical axis direction by the force of the driving gear train 10, as mentioned above, the lens driving gears 21 and 23 and the lens driving worm gear 28 are subject to the rotational biasing force of the tensile spring 24 during the rotation thereof in the clockwise and counterclockwise direction, since the tensile spring 24 causes the lens driving lever 26 to always act in the upstream side of the transmission through the lever 22. Accordingly, the gears 21, 23 and 28 are always forceably in mesh with each other on one side or the other of the teeth thereof during the rotation, and even at rest. Thus, the gear train 10 can be smoothly rotated without producing noise or oscillation.

Prior to the attachment of the zoom view finder 11 to the camera body, the lens driving worm gear 28 is slightly rotated, to rotate the drive cam lever 22 in the counterclockwise direction to thereby cause the cam pin 18 to push the lens driving lever 26, in order to keep the latter in the adjusted position immediately before the commencement of rotation. In this position, the biasing force (rotational force) of the tensile spring 24 through the lens driving gears 23 and 21, etc. is restricted by the worm gear 28 which serves as a stop. Consequently, it is possible to manually rotate the worm wheel mechanism (lens driving gear 23 and the lens driving worm gear 28) in order to maintain the variable power lens group 33 in an adjusted position, prior to the attachment of the view finder 11 to the camera body 50. The driving timing of the zoom view finder 11 can be appropriately set before connecting the lens driving worm gear 28 to the drive source (drive motor).

The zoom view finder 11 of the present invention can be easily attached to and detached from the camera body 50 for inspection or repairs, etc., without disassembling the other elements. During the attachment or detachment, the gear train 10 (input mechanism) provided outside the finder case 9 can be easily connected to and disconnected from the drive source. Since the movable variable lens group 33 and the internal drive mechanism 60 are provided in the closed finder unit, they can be protected from dust or the like. Prior to the attachment, the worm wheel mechanism comprised of the lens driving gear 23 and the lens driving worm gear can be manually rotated to maintain the variable power lens group 33 in an adjusted position, as mentioned above.

Since the worm wheel mechanism is continuously biased to be rotated by tensile spring 24 (biasing mechanism), the gears thereof are forceably in mesh with other only on one face of the teeth, so thereof so that the gears can be smoothly rotated, as mentioned above.

Although the zoom view finder of the illustrated embodiment is applied to the zoom view finder 11 having a single variable power lens group 33, the present invention can be also applied to a zoom view finder having a plurality of movable variable power lens groups.

I claim:

1. A zoom view finder having a stationary lens group and a movable variable power lens group, comprising:
    biasing means for biasing said movable variable power lens group in a predetermined optical axis direction;
    a drive mechanism for driving said movable variable power lens group;
    a unified finder case in which said stationary lens group, said movable variable power lens group, said biasing means and said drive mechanism are supported; and,
    a worm wheel mechanism connected to said drive mechanism for maintaining said movable variable power lens group in a predetermined adjusted position against said biasing means.

2. The zoom view finder of claim 1, wherein said drive mechanism is movable with respect to said movable variable power lens group.

3. The zoom view finder of claim 1, said drive mechanism comprising a drive linkage.

4. The zoom view finder of claim 1, said drive mechanism being movable along a path of movement different than a path of movement of said movable variable power lens group.

5. A zoom view finder comprising:
    at least one group of stationary lenses;
    at least one group of variable power lenses movable relative to said at least one group of stationary lenses in a direction along an optical axis of said at least one group of stationary lenses;
    a drive mechanism to be connected to a drive source so as to drive said variable power lens group along the optical axis;
    a support member supporting said at least one group of stationary lenses and supporting said at least one group of variable power lenses for movement relative to said at least one group of stationary lenses, said support member comprising at least one linear guide surface for guiding movement of said at least one group of variable power lenses in a direction along the optical axis of said at least one group of stationary lenses, said support member further defining a pivot shaft;
    said drive mechanism comprising a cam member supported for pivoting movement about said pivot shaft, said cam member comprising at least one cam slot;
    said at least one group of variable power lenses comprising a pin engaged with said cam slot and driving said at least one variable power lens group along the optical axis of said at least one of stationary lenses in association with movement of said cam member.

6. A zoom view finder according to claim 5, said drive mechanism further including at least one gear for transmitting drive motion to said cam member.

7. A zoom view finder according to claim 5, said at least one group of stationary lenses comprising at least front and rear groups of stationary lenses.

8. A zoom view finder according to claim 5, said support member comprising a portion of a split frame which support said stationary lens groups, said movable variable power lens group, and said drive mechanism, said at least one stationary lens group and said split frame comprising a substantially closed finder unit.

9. A zoom view finder according to claim 8, said at least one linear guide surface being provided in a side surface of said split frame.

10. A zoom view finder assembly comprising:
    at least one group of stationary lenses;
    a group of variable power lenses movable relative to said stationary group of lenses;
    a unified finder case fixed to a body of a camera against movement with respect to the body of the camera, said unified finder case comprising means for supporting and enclosing said stationary lens group and said moveable variable lens group;
    an internal drive mechanism provided within said unified finder case for driving said group of variable power lenses;
    an external drive gear; and
    means for mounting said external drive gear on an outer surface of said unified finder case, said drive gear comprising a drive shaft connected with said internal drive mechanism, said external drive gear including means for enabling said external drive gear to be detachably connected to an external drive source for driving said variable power lens group;
    wherein said assembly is capable of being assembled for mounting within the camera independently of other camera mechanisms.

11. The zoom view finder assembly according to claim 10, said drive shaft extending through a wall of said unified finder case.

12. The zoom view finder assembly according to claim 10, said external drive gear comprising a gear element mounted for rotation on an outer surface of said unified finder case.

13. The zoom view finder assembly according to claim 10, said internal drive mechanism comprising at least one pivotally mounted lever, said pivotally mounted lever including a cam surface.

14. The zoom view finder assembly according to claim 10, said internal drive mechanism including at least one pivotally mounted lever, said pivoted lever comprising first camming means for being driven by said external drive gear and second camming means for driving said group of variable power lenses.

15. The zoom view finder assembly according to claim 10, said unified finder case comprising an upper frame, a lower frame and an intermediate frame between said upper and lower frames.

16. The zoom view finder assembly according to claim 10, further comprising guide means, positioned within said unified finder case, for guiding movement of said variable power lens group.

17. The zoom view finder assembly according to claim 10, further comprising biasing means, within said unified finder case, for biasing said variable power lens group in a predetermined direction.

18. The zoom view finder assembly according to claim 10, further comprising means, supported on said unified finder case, for securing said zoom view finder assembly to a camera body.

19. The zoom view finder assembly according to claim 10, wherein said internal drive mechanism is enclosed within said unified find case.

20. The zoom view finder assembly according to claim 10, further comprising means for mounting said finder case to the body of the camera to prevent movement of said finder case with respect to the body.

* * * * *

UNITED STATES PATENT AND TRADEMARK OFFICE
CERTIFICATE OF CORRECTION

PATENT NO. : 5,337,109
DATED : AUGUST 9, 1994
INVENTOR(S) : Yuzi OGAWA

It is certified that error appears in the above-indentified patent and that said Letters Patent is hereby corrected as shown below:

At column 5, line 49 (claim 2, line 1), change "of" to -- -according to---.

At column 6, line 27 (claim 8, line 3), change "support" to ---supports---.

Signed and Sealed this

Twenty-eight Day of March, 1995

Attest:

BRUCE LEHMAN

Attesting Officer            Commissioner of Patents and Trademarks